(12) United States Patent
Hegarty et al.

(10) Patent No.: US 7,048,116 B2
(45) Date of Patent: May 23, 2006

(54) CASE FOR A DISC-LIKE ARTICLE

(75) Inventors: John Hegarty, Dublin (IE); Dominic Southgate, Naas (IE)

(73) Assignee: Dualbox Limited, Shankill (IE)

( * ) Notice: Subject to any disclaimer, the term of this patent is extended or adjusted under 35 U.S.C. 154(b) by 67 days.

(21) Appl. No.: 10/384,705

(22) Filed: Mar. 11, 2003

(65) Prior Publication Data

US 2003/0217939 A1 Nov. 27, 2003

Related U.S. Application Data

(63) Continuation of application No. PCT/IE01/00119, filed on Sep. 10, 2001.

(30) Foreign Application Priority Data

Sep. 11, 2000 (IE) ............................. S2000/0727

(51) Int. Cl.
*B65D 85/57* (2006.01)
(52) U.S. Cl. .................... 206/308.1; 206/503
(58) Field of Classification Search ............ 206/303, 206/307, 308.1, 309, 387.11, 503, 308.3; 312/9.47, 9.48, 9.54, 9.55, 9.56, 9.57, 9.64
See application file for complete search history.

(56) References Cited

U.S. PATENT DOCUMENTS

| | | | | |
|---|---|---|---|---|
| 4,702,369 A | * | 10/1987 | Philosophe | 206/312 |
| 4,722,439 A | * | 2/1988 | Grobecker et al. | 206/308.1 |
| 5,213,209 A | | 5/1993 | Song | 206/309 |
| 5,720,386 A | * | 2/1998 | Allsop et al. | 206/308.1 |
| 5,725,105 A | | 3/1998 | Boland | 211/40 |
| 5,746,314 A | | 5/1998 | Knutsen et al. | 206/308 |
| 5,768,253 A | | 6/1998 | Tricart | 369/291 |
| 5,906,275 A | | 5/1999 | Jokic | 206/308 |
| 5,931,295 A | | 8/1999 | Kaupp | 206/308 |
| 6,237,763 B1 | * | 5/2001 | Lau | 206/308.1 |
| 6,241,089 B1 | * | 6/2001 | Grobecker | 206/310 |
| 6,398,022 B1 | * | 6/2002 | Mou et al. | 206/308.1 |

FOREIGN PATENT DOCUMENTS

| | | |
|---|---|---|
| DE | 29605259 U1 | 7/1996 |
| GB | 2341594 A | 3/2000 |

* cited by examiner

*Primary Examiner*—Mickey Yu
*Assistant Examiner*—Jerrold D. Johnson
(74) *Attorney, Agent, or Firm*—Jacobson Holman PLLC

(57) ABSTRACT

A CD case has a drawer which may be pulled out by a handle for access to a CD. The drawer can be easily inserted during production, and multiple drawers can be stacked in stable manner. A front wall engages in a groove in a drawer stacked on top of it to provide stability. A CD is retained in a seat by a retainer having opposed gripping retainer elements. A CD is released by a user pressing a button, causing arm branches to pull together because of configuration of a resilient anchorage.

5 Claims, 5 Drawing Sheets

CASE FOR A DISC-LIKE ARTICLE

This is a continuation of PCT/IE01/00119 filed Sep. 10, 2001 and published in English.

INTRODUCTION

1. Field of the Invention

The invention relates to cases for disc-like articles such as CDs or DVDs.

2. Prior Art Discussion

At present, such cases typically comprise bottom and top hinged covers and an inset in the bottom cover for holding the article. While this arrangement provides good support and protection for the article, it does not lend itself to convenient storage of multiple cases by users, or convenient handling during insertion of articles by the producer. U.S. Pat. No. 5,725,105 (Boland) describes a rack having guide rails for supporting multiple cases. Use of such a rack adds expense to the user and takes up more space. Also, it does not help with the materials handling problems faced by the producer.

It is also known to propose a case having a drawer, as described for example in U.S. Pat. No. 5,931,295 and U.S. Pat. No. 5,213,209. However, these cases are complex and so are not suited to high-volume and low-cost production.

It is therefore an object of the invention to provide a case which allows for easier insertion and removal of articles by the user, and which does not require use of a rack for storage of multiple cases.

Another object is to provide for simpler materials handling by producers, both for producing cases, and for inserting articles such as CDs in cases for sale or rental of a media product.

SUMMARY OF THE INVENTION

According to the invention, there is provided a drawer for a case for holding a disc-like article, the drawer comprising:
  a seat on an upper side of the drawer for a disc-like article, and
  means for sliding engagement with a housing of the case for movement between a closed position within the housing and an open position projecting from the housing, characterised in that,
  the drawer comprises stacking formations allowing a plurality of the drawers to be stacked one above another with the formations inter-engaging.

In one embodiment, said formations comprise means for allowing a plurality of drawers to be stacked with the seats being parallel to a supporting platform.

In another embodiment, the drawer comprises a front wall extending transversely to a plane of the drawer, and a formation comprises part of said wall.

In a further embodiment, said formation comprises an upwardly-directed part of the front wall extending above a level of the article seat.

In one embodiment, a formation comprises a groove in a lower side of the drawer and being shaped to engage with said upwardly-directed part of the front wall.

In another embodiment, the front wall comprises a recessed portion connected to a user handle.

In a further embodiment, said formations comprise projections on the upper side of the drawer at a rear extremity of the drawer.

In one embodiment, the seat comprises a retainer for engagement with a central aperture of an article, the retainer being mounted on an arm extending between a button and a resilient anchorage, and the retainer being shaped to release engagement with an article when the button is pressed in an action causing the arm to move against resilience of the anchorage.

In another embodiment, the retainer comprises two elements each mounted on a separate branch of the arm, and the branches are connected to the resilient anchorage such that the branches and thus the elements are pulled towards each other when the arm is pulled away from the anchorage.

In one embodiment, the housing comprises an opening which exposes the button when the drawer is in a closed position.

In another embodiment, the resilient anchorage, the arm, and the button are integral parts of the drawer.

According to another aspect, the invention provides a drawer for a case for holding a disc-like article, the drawer comprising:
  a seat on an upper side of the drawer for a disc-like article,
  means for sliding engagement with a housing of the case for movement between a closed position within the housing and an open position projecting from the housing, and
  a retainer in the seat for engagement with a central aperture of a disc-like article,
  characterised in that,
  the retainer comprises:
    at least two opposed retainer elements biassed for snap-fitting engagement with opposed side edges of a disc-like article central aperture, and
    a user button operatively connected to the retainer elements so that user pressing of the button causes the retainer elements to be pulled towards each other to release the article.

In one embodiment, the retainer elements are each mounted on a branch of an arm linking the button with a resilient anchorage, said resilient anchorage comprising means for allowing movement of the branches in a direction towards each other.

In another embodiment, the resilient anchorage comprises a resilient arm associated with each branch, and being located to allow controlled movement of each branch.

In a further embodiment, the retainer, the resilient anchorage, and the button are all an integral part of the drawer.

According to a further aspect the invention provides a case for holding a disc-like article comprising a drawer as defined above and a housing comprising means for engagement with the drawer.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

Figure 1:
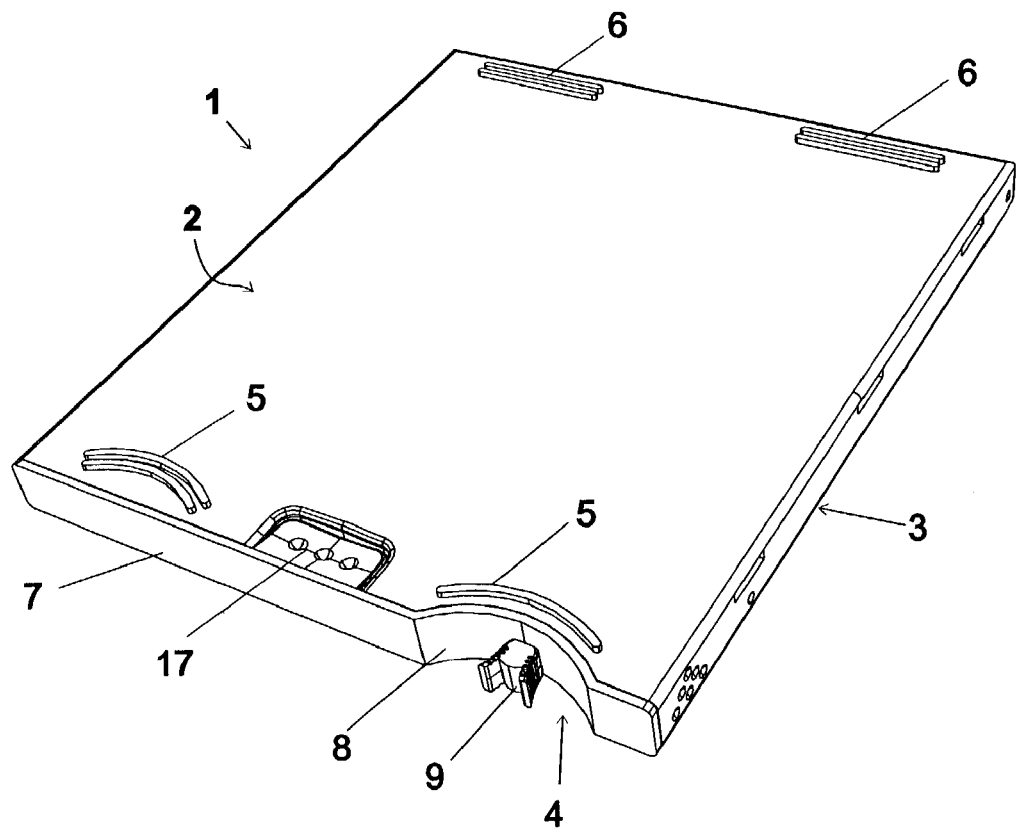
FIG. 1 is a perspective view from above of a CD case.

Referring to FIG. 1 a CD case 1 comprises a top cover 2 and a bottom cover 3 hinged together. A drawer 4 is mounted between the covers 2 and 3. Thus, the case has only three parts, each of moulded plastics material.

The top cover 2 has on its top surface ridges 5 for engagement with corresponding recesses in the bottom cover 3 of a case 1 placed on top of it. This allows multiple cases 1 to be easily stacked directly on top of each other in a stable manner.

The drawer 4 comprises a front wall 7 abutting front edges of the covers 2 and 3 when the drawer 4 is in a closed position as shown in FIG. 1. The wall 7 comprises a recessed portion 8 from which projects a handle 9. The handle 9 is ribbed in the vertical direction for ease of gripping.

Figure 2A:
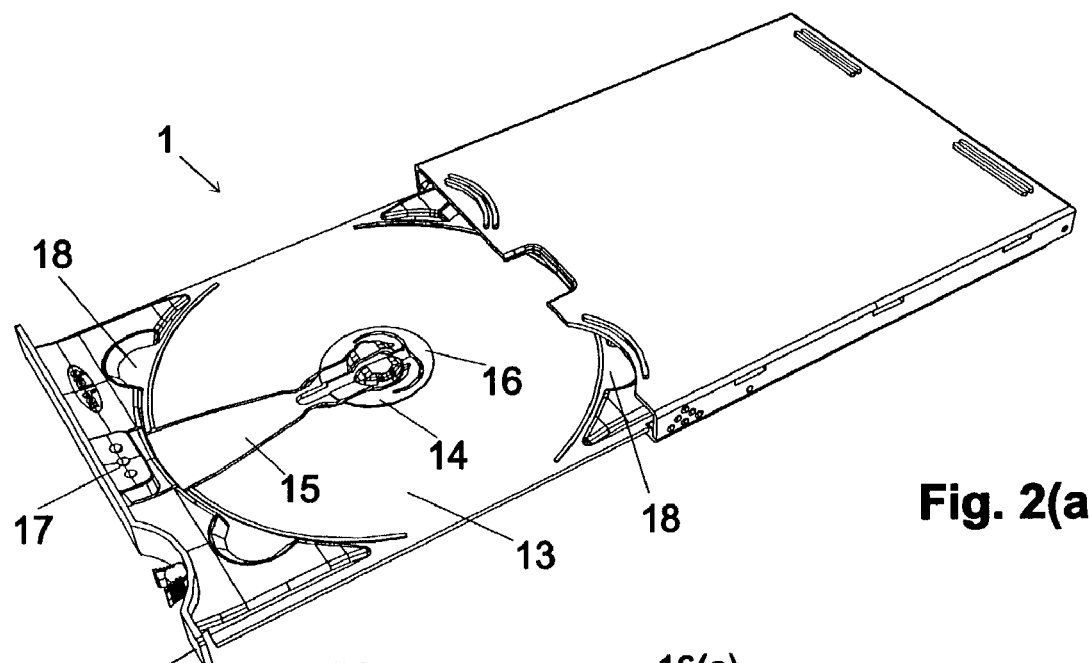
FIG. 2(a) is a perspective view showing the case with a drawer in an open position.

Referring to FIG. 2(a), the drawer 4 is shown in an open position, achieved by the user simply pulling the handle 9. In this way, a CD may be accessed without removing the case 1 from a stack of cases. As shown in FIG. 2(a), the drawer 4 comprises a seat 13 for a CD, and a retainer 14 for engagement with the central aperture of a CD. The retainer 14 is on an arm 15 extending between a resilient anchorage 16 at its inner end and a front push-button 17 at its outer end. As shown in FIG. 1 the push-button 17 is exposed by an opening in the top cover 2 when the drawer is closed. The drawer 4 also comprises four finger-grip recesses 18 around the seat 13.

Figure 3:
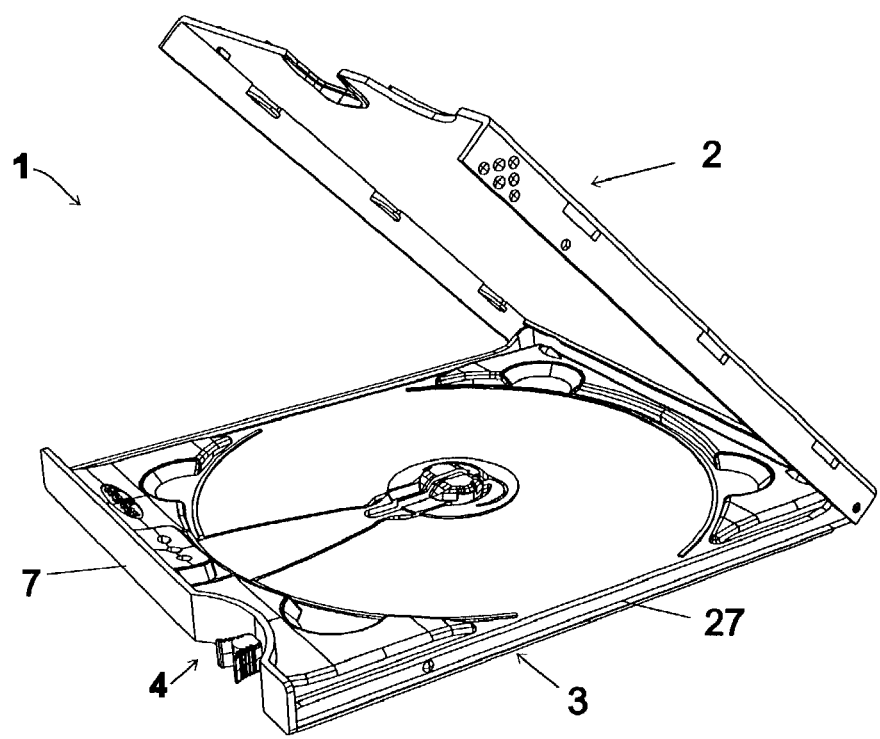
FIG. 3 is a perspective view showing the case with the drawer at a closed position and a top cover open.
Figure 4:
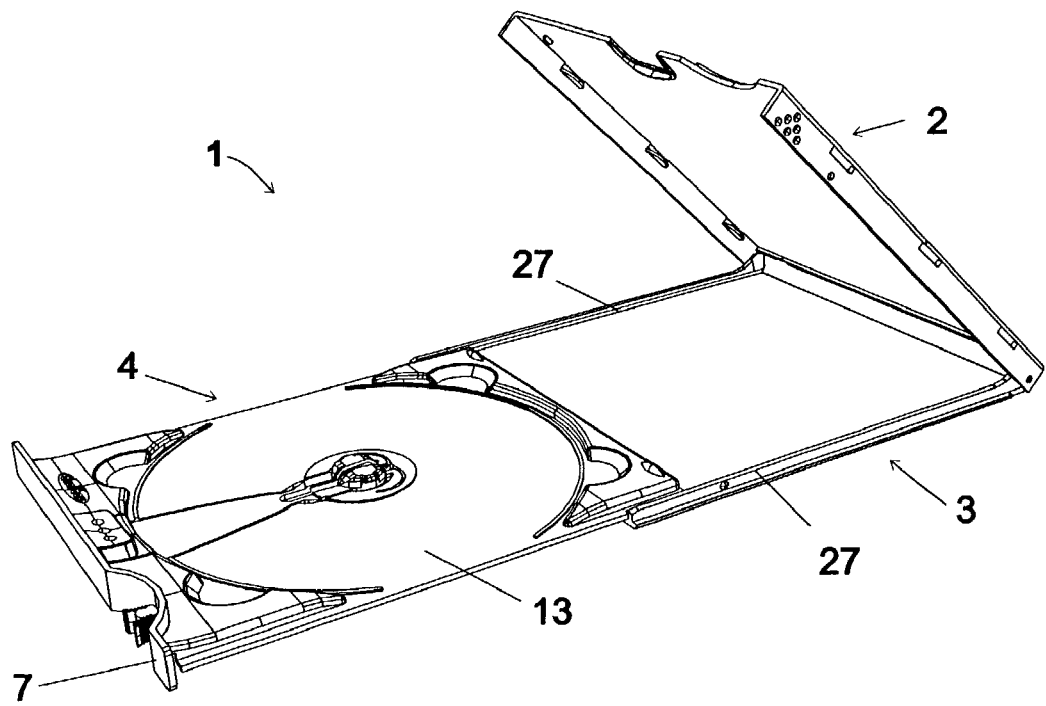
FIG. 4 is a perspective view of the case showing both the top cover and the drawer in open positions.
Figure 5:
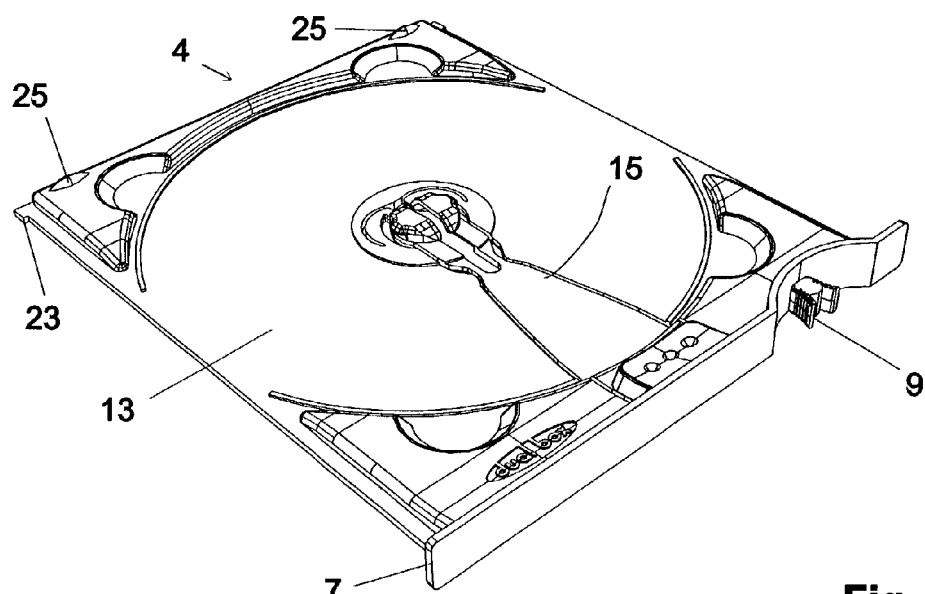
FIG. 5 is a perspective view from above of the drawer.
Figure 6:
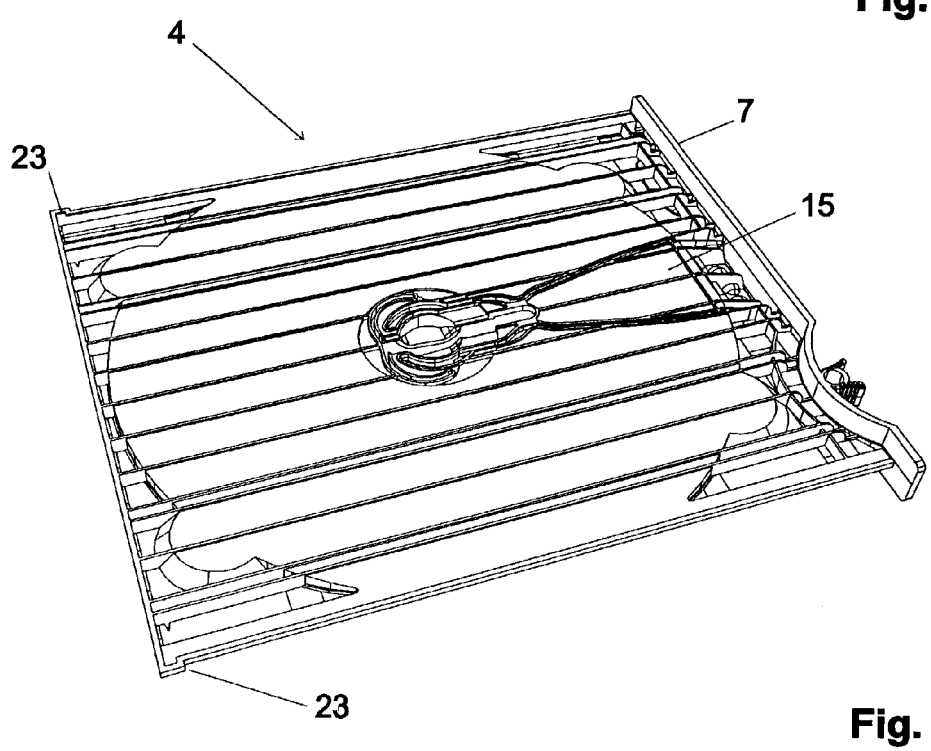
FIG. 6 is a perspective view from below of the drawer.
Figure 7:
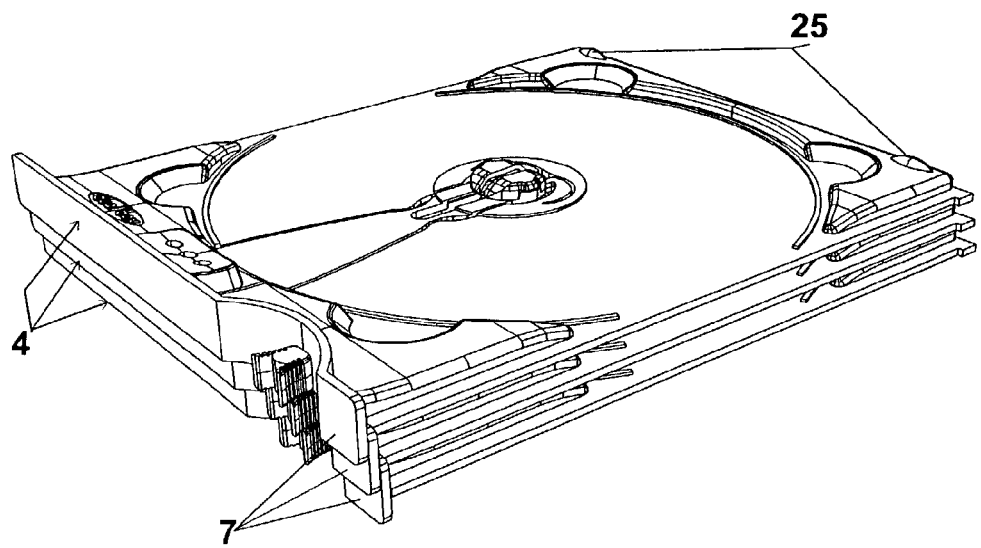
FIG. 7 is a perspective view of a set of three drawers when stacked one above the other during production and before final assembly of the case.
Figure 8:
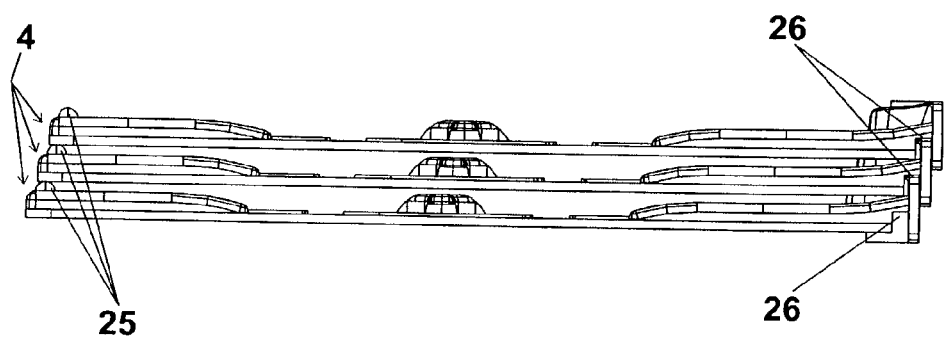
FIG. 8 is a side view of the three stacked drawers of FIG. 7.

Referring to FIG. 3 the seat 13 may be accessed alternatively by opening the top cover 2. As shown in FIG. 4, the drawer 4 may slide out to its open position while the top cover 2 is open.

Figure 2B:
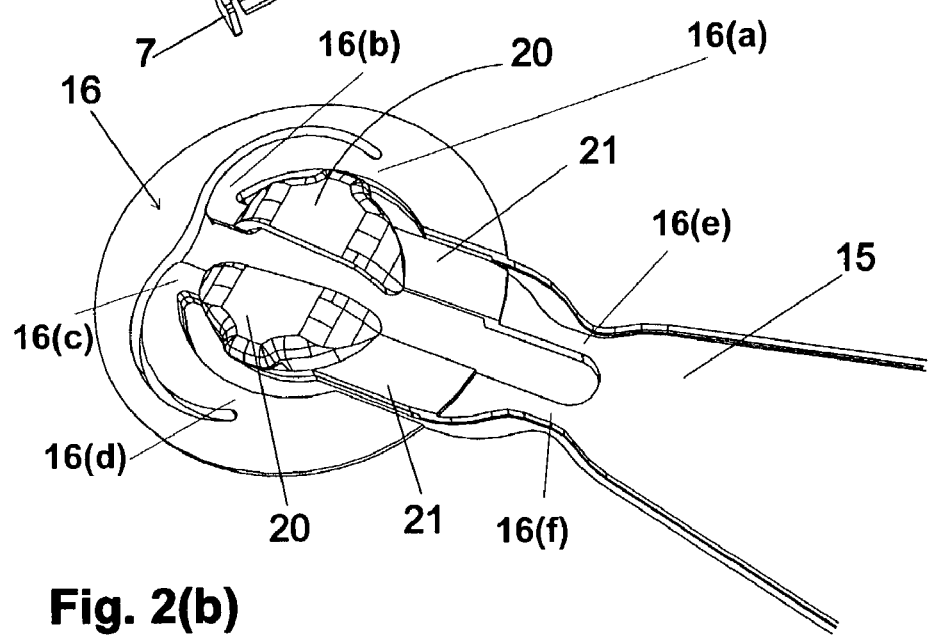
FIG. 2(b) is a larger scale view of CD retaining features of the drawer.

As shown in FIG. 2(b) the retainer 14 comprises a pair of retainer elements 20, each connected individually to the resilient anchorage 16 by a branch 21 of the arm 15. The anchorage 16 comprises a resilient arm associated with each element 20. The resilient arm for the right hand element 20 terminates in hinge points 16(a) and 16(b), and that for the left hand element 20 terminates in hinge points 16(c) and 16(d). Thus, when a user presses the push-button 17, the arm 15 is pulled towards the front. This action causes the branches 21 to pull against the resilient anchorage 16. The shape of the resilient arms in the anchorage are such as to cause the branches 21, and thus the elements 20, to be pulled together. This releases the CD. The CD may alternatively be released by pressing down on the elements 20 with one's finger. Because the push-button 17 is exposed when the drawer 4 is in the closed position, the CD may be released at this position.

Figure 2C:
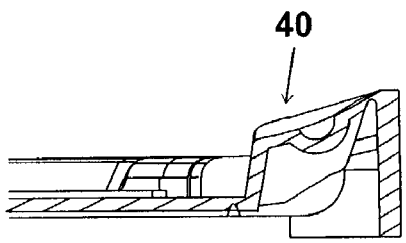
FIG. 2(c) is a cross-sectional view of an alternative push-button.

In more detail, a downward slant of the push-button 17 allows effective forward movement of the arm 15 generally in the plane of the drawer 4. The degree of slant may be different from that illustrated in FIG. 2(a), as shown for example in FIG. 2(c) in an alternative button 40. The two elements 20 grip the CD very effectively because of their inherent resilience and opposed snap-fitting ledges. However, this grip is released in a very simple and effective manner because the anchorage 16 translates forward motion of the main body of the arm 15 into a partly lateral movement of the branches 21 towards each other. Once the finger pressure on the push-button 17 ceases the elements 20 spring back to their natural positions, ready to receive a CD again. There is excellent reliability of the retainer 14 because hinging movement of the plastics material of the drawer 4 is spread around six hinge points as follows:

(i) the ends 16(a), 16(b), 16(c), and 16(d) of the resilient arms of the resilient anchorage 16.

(ii) hinge points at starts of the branches 21, indicated as 16(e) and 16(f).

It will be appreciated that the full mechanism for retaining and releasing a CD (items 15, 16, and 17) are all incorporated in an integral moulding of the drawer 4. No separate parts are needed and there is a total of only three parts in the whole case 1, and of course only one moulding part for the drawer 4. It will also be appreciated that the action of releasing a CD can be conveniently achieved using only one hand.

Referring to FIGS. 5 to 8, the drawer 4 is shown during production of either the case 1 itself or of a media product using the case 1. These drawings illustrate an advantageous feature whereby the drawer 4 may be very easily handled during production because it comprises only one moulding part and because multiple drawers 4 can be conveniently stacked. The drawer 4 comprises a pair of upwardly-directed projections 25 at its rear extremity. Also, where the main body of the drawer 4 adjoins the front wall 7 there is a groove 26 shaped to engage with the top of the wall 7 of a drawer 4 underneath it.

As shown most clearly in FIGS. 5 to 8 multiple drawers 4 may be stacked in a stable manner. It will be noted that the grooves 26 and corresponding walls 7 prevent sliding movement in any of the four directions in a horizontal plane because of the shape arising from the recess 8. Also, the projections 25 ensure that the seat 13 of each drawer is horizontal.

These features allow highly automated handling of drawers 4. Indeed, because of stability of the drawers 4 they may be stacked while retaining the CDs in the seats 13 if desired.

FIGS. 5 to 8 also illustrate a pair of lateral keys 23 at the rear extremity. These are for engagement with rails 27 of the bottom drawer 3. This is a very simple arrangement. Indeed, because of the simple sliding action, the one-piece construction and the integrated CD retaining and release features the drawer 4 may be easily adapted for use in a housing of a case other than that provided by the covers 2 and 3. Such an alternative housing is only required to surround the drawer 4 and to provide a suitable rail for the keys 23.

It will be appreciated that the CD case 1 is very easy for a consumer to use. The case may be opened by either lifting the top cover 2 to or by sliding out the drawer 4. A CD is simply placed in the seat 13 by pressing it down at the retainer 14. The CD may be simply released by pressing the retainer 14 or by pressing the button 17. The drawer 4 may be easily gripped at the handle 9 because it is mounted within a convenient recess 8. For production and packing of CD products, the CDs may be dispensed into the drawers 4 and they are stacked as shown in FIGS. 7, 8, 10, and 11 at interim stages before insertion with the rest of the case 1. The drawers 4 may also stacked in this manner before CDs are placed in them. This is particularly important for automated production machines both for handling the drawers, for dispensing CDs, and also for packing stages.

The invention is not limited to the embodiments described. For example, it is envisaged that different variations of stacking/nesting configurations would be possible to provide stability for stacking of the drawers during production. Also, the case need not have hinged top and bottom covers and the seat may be accessible only by pulling out the drawer 4. It is also envisaged that the arm for the retainer may comprise two branches along its full length. The invention may be applied to holding disc-like articles other than CDs, such as DVDs.

What is claimed is:

1. A plurality of drawers for stacking one above another including at least a top drawer and an underneath drawer, each drawer being for a case for holding a disc-like article, each drawer comprising:
   a seat on an upper side of the drawer for a disc-like article, and
   means for sliding engagement with a housing of the case for movement between a closed position within the housing and an open position projecting from the housing,
   each drawer comprising stacking formations allowing the plurality of drawers to be stacked one above another with the formations inter-engaging, said formations comprising means for allowing the plurality of drawers to be stacked with the seats being substantially parallel to a supporting platform; and
   each drawer comprising a front wall extending transversely to a plane of the drawer, and a formation comprising an upwardly-directed part of the front wall extending above a level of the article seat; and a formation comprising a groove in a lower side of the drawer and adjacent the front wall and being shaped to engage with an upwardly-directed part of the front wall of the underneath drawer.

2. The plurality of drawers as claimed in claim 1, wherein the front wall comprises a recessed portion connected to a user handle.

3. The plurality of drawers as claimed in claim 1, wherein the seat comprises a retainer for engagement with a central aperture of an article, the retainer being mounted on an arm extending between a button and a resilient anchorage, and the retainer being shaped to release engagement with an article when the button is pressed in an action causing the arm to move against resilience of the anchorage.

4. The plurality of drawers as claimed in claim 3, wherein the retainer comprises two elements each mounted on a separate branch of the arm, and the branches are connected to the resilient anchorage such that the branches and thus the elements are pulled towards each other when the arm is pulled away from the anchorage.

5. The plurality of drawers as claimed in claim 3, wherein the resilient anchorage, the arm, and the button are integral parts of the drawer.

* * * * *